United States Patent [19]

Sieben

[11] Patent Number: 4,496,119
[45] Date of Patent: Jan. 29, 1985

[54] MAGNETIC-TAPE CASSETTE WITH SIMPLIFIED REEL BRAKE

[75] Inventor: Joannes H. F. C. Sieben, Eindhoven, Netherlands

[73] Assignee: U.S. Philips Corporation, New York, N.Y.

[21] Appl. No.: 527,058

[22] Filed: Aug. 29, 1983

[30] Foreign Application Priority Data

Feb. 9, 1983 [NL] Netherlands ..................... 8300476

[51] Int. Cl.³ ..................... G03B 1/04; G11B 15/22; G11B 15/32
[52] U.S. Cl. ..................... 242/198; 242/68.1; 242/200; 360/132
[58] Field of Search ..................... 242/198, 199, 71.2, 242/200; 360/132

[56] References Cited

U.S. PATENT DOCUMENTS 4,288,048  9/1981  Sieben ..................... 242/198
4,449,677  5/1984  Ohta et al. ..................... 242/199

Primary Examiner—Stuart S. Levy
Assistant Examiner—Leo J. Peters
Attorney, Agent, or Firm—David R. Treacy

[57] ABSTRACT

A magnetic tape cassette having adjacent flanged reels mounted for rotation between major walls of a housing. A brake spring has intermediate portions arranged between respective projections on a major wall and the rear wall. A slide member movable on a ridge between the reels engages the spring between its center and each intermediate portion, to move the spring end portions away from or toward the flanges.

6 Claims, 12 Drawing Figures

MAGNETIC-TAPE CASSETTE WITH SIMPLIFIED REEL BRAKE

BACKGROUND OF THE INVENTION

The invention relates to a magnetic-tape cassette comprising a housing in which adjacent reels provided with flanges are mounted for rotation, and in particular to a cassette having a brake device for tensioning the tape when the cassette is not in use.

SUMMARY OF THE INVENTION

It is the object of the invention to miniaturise such a cassette so that it is suitable for use in conjunction with small, preferably portable, magnetic-tape cassette apparatus.

According to the invention, a magnetic-tape cassette is characterized in that on the inner side of a major wall of the housing near each reel there is arranged a projection and between the projections there is arranged a ridge which extends substantially perpendicularly to the rear wall, a brake spring, situated in the space between the rear wall and the projections, being secured in the centre near the end of the ridge and being at least partly movable by means of a slide member which is slidable over the ridge, so that braking portions of the brake spring disposed near the ends can be moved away from and towards the flanges respectively.

These steps provide a reel brake with a minimum number of parts, which brake in addition to its braking function also has a winding function for the magnetic tape.

Some embodiments of the invention will now be described in more detail, by way of example, with reference to the drawings.

DESCRIPTION OF THE PREFERRED EMBODIMENTS

Figure 1:
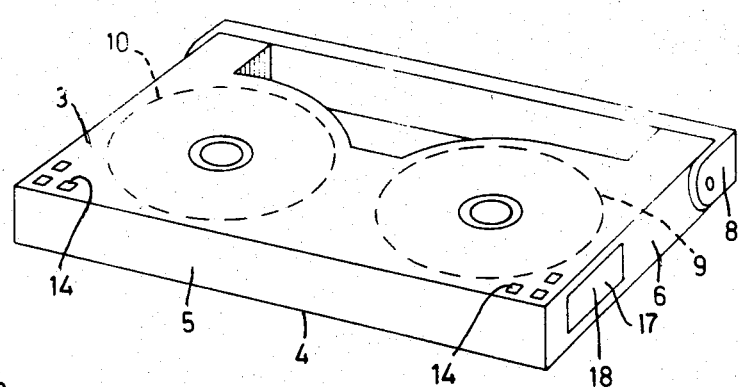
FIG. 1 is a perspective view of a magnetic-tape cassette in which the invention may be used.
Figure 2:
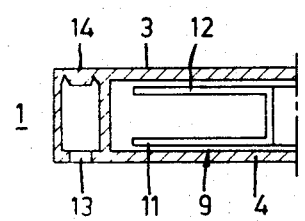
FIG. 2 is a sectional view of a part of the magnetic-tape cassette shown in FIG. 1.

The magnetic-tape cassette 1 shown in FIGS. 1 and 2 comprises a housing 2 which preferably has a box-lid construction, the lid comprising a substantially rectangular major wall 3 and the bottom of the box also comprising a substantially rectangular major wall 4. Further the housing 2 comprises a rear wall 5, side walls 6 and 7 and a front cover 8 which is pivotably connected to the side walls 6 and 7. The major wall 3 has two recesses in which reels 9 and 10 are mounted for rotation. Each reel comprises a first flange 11, disposed near the major wall 4, and a second flange 12, disposed near the major wall 3.

Near the corners of the side walls 6 and 7 with the rear wall 5 the housing 2 is formed with a plurality of sensing apertures 13, preferably three near each corner. The major walls 3 comprise brek-out portions 14 which can be removed to form apertures in the major wall 3. These apertures are disposed in line with the apertures 13 in the major wall 4 and thereby enable sensing by light projected through the housing. This provides a cassette-identification facility which is readily adjustable during manufacture. The parameters which can be laid down by means of the break-out portions 14 are, for example, the speed with which the recording on the magnetic tape has been made, the type of magnetic tape in the cassette, whether the cassette has been prerecorded, etc.

Figure 3:
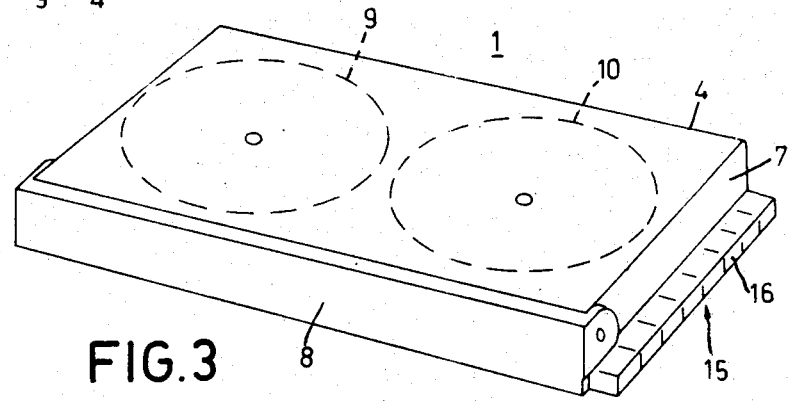
FIG. 3 is a perspective view of a second embodiment magnetic-tape cassette in which the invention may be used.

The information with respect to the cassette parameters may also be laid down in a different manner. FIG. 3 shows the use of an identification ledge 15 on the side wall 7 of the cassette 1, which identification ledge comprises, for example, eight or more removable, pivotable, slidable or pluggable portions 16. The presence or absence of the projecting portions 16 can be detected by a magnetic-tape apparatus. This detection may be effected by the apparatus mechanically by means of levers or switches, optically by means of light cells or in a different manner. By means of the portions 16 a large number of cassette parameters can be laid down; the eight blocks shown enable sixteen parameters and, if a binary system is used, even 256 parameters to be laid down in a simple manner. These parameters may relate to the prerecorded condition, the type of magnetic tape, the tape length, the tape thickness, audio or video recording, indications as to the nature of the program, the recording date etc. It is to be noted that the ledge 15, comprising the movable portions 16, may alternatively be arranged on the other side wall of the rear wall of the housing. Moreover, it is possible to equip one of the major walls with such a ledge.

FIG. 1 shows how the housing wall comprises a recessed portion 17 which can receive a strip of a tape-like material 18. This strip of material may be a strip of magnetic tape of, for example, 40 to 50 mm length and a width of 2 to 3 mm. In the magnetic-tape apparatus the strip, whichis glued to the cassette, can be scanned by a write/read head to provide information about the type of tape, tape thickness, length, program type and duration, counter position etc. when old programs are erased and new programs are recorded the variable cassette data can be entered via a keyboard to be stored on the strip. Another possibility of detecting the fixed cassette data is to provide the strip of material, for example on the rear wall 5, with a single or a multiple bar code containing the data which are optically read by the apparatus, for example during the insertion movement of the cassette into the apparatus.

Figures 4, 5:
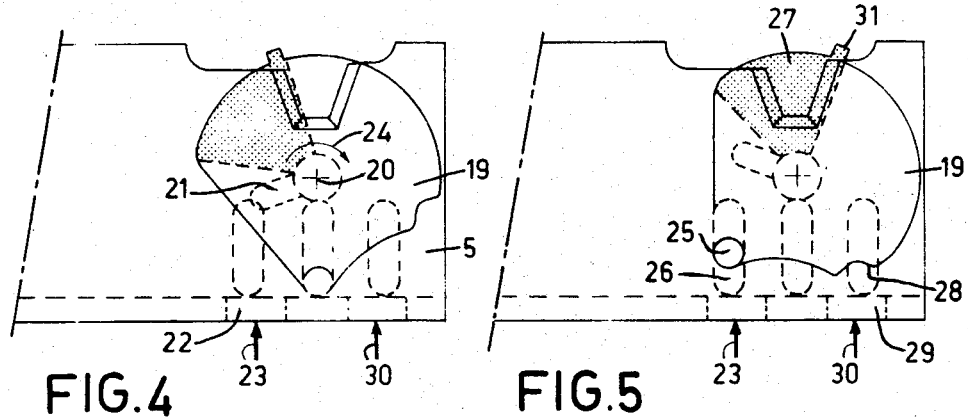
FIGS. 4 and 5 are views at a part of the rear wall of a third embodiment magnetic-tape cassette in which the invention may be used.

FIGS. 4 and 5 show how an indication can automatically be obtained of recording on the cassette in a portable magnetic-tape apparatus. The basic concept is that each cassette is intended for use in a portable apparatus and in a home or studio apparatus. These two apparatuses operate at different speeds. The portable apparatus should provide the cassette with an indication which can be identified by the residential apparatus. When this indication is detected the non-portable apparatus will select a speed other than the normal speed, i.e. the speed of the portable apparatus, which may be required in order to obtain a satisfactory picture quality. For this purpose the cassette is provided with an at least partly cylindrical indication element 19 situated near the rear wall 4, which element is pivotable about an axis 20. The indicator element 19 is provided with an actuating portion 21, which in the position shown in FIG. 4 is situated opposite an aperture 22 in a major wall of the housing and which can be actuated by an actuating element of the magnetic-tape apparatus, which element is schematically represented by the arrow 23, and penetrates the housing through the aperture 22, causing the indication element to be rotated about the axis 20 in the direction indicated by the arrow 24. The actuating element 19 then moves to a position shown in FIG. 5, in which a projection 25 engages a recess 26 in the rear wall 5. In this way the indicator element 19 is latched in this position. Moreover, an indicator field 27 is clearly visible in this position from outside the housing, preferably both when viewed at the major wall and when viewed at the rear wall. In this position a sensing portion 28 is disposed before an aperture 29 in the housing, so that a sensing element of the apparatus, schematically represented by the arrow 30, can detect the presence of the sensing portion 28. Thus, in this position of the indicator element, the magnetic-tape apparatus will assume the correct setting for playing back the recording made by means of the portable apparatus. For resetting the indicator element 19 a member 31 is provided which can be set manually to the position shown in FIG. 4 from outside the housing.

BRAKE MECHANISM

Figure 6:
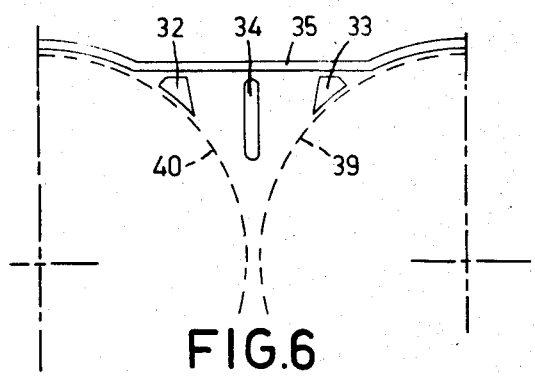
FIGS. 6 to 8 are plan views of a braking device for a magnetic-tape cassette in accordance with the invention.
Figure 7:
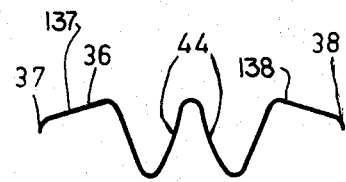
Figure 8:
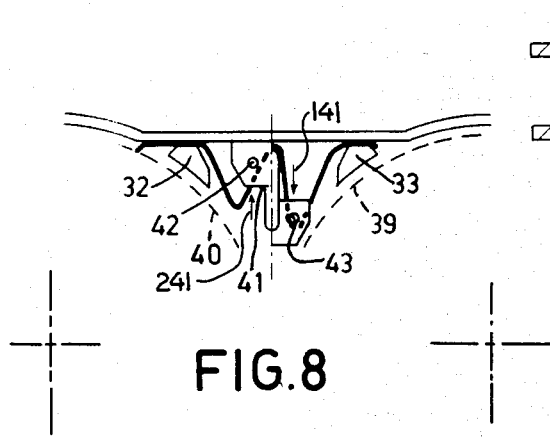

As shown in FIGS. 6–8, two projections 32 and 33 are symmetrically arranged about a ridge 34 on the inner side of the major wall 4 of the cassette 1. The ridge preferably extends perpendicularly to a rear wall 35. In the space between the rear wall 35 and the projections 32 and 33 a continuous, preferably W-shaped brake spring 36 is enclosed. The brake spring 36 is secured in the center near the end of the ridge 34 and has intermediate portions 137 and 138 slidable in the space between the projections 32 and 33 respectively and the rear wall 35. As a result of prestress the spring 36 is expanded as far as possible with the free ends 37 and 38 directed towards the flanges 39 and 40, so that the ends are engageable with the teeth of the circumference of the flanges 39 and 40. A slide member 41 which carries two fork limbs 42 and 43 is movable rectilinearly over the ridge 34. Movement of the slide 41 in the direction of arrow 141 causes the fork limbs 42 and 43 to urge the portions 44 of the spring towards each other. As a result of movement of the portions 44 toward the ridge 34, the ends 37 and 38 of the spring are moved towards each other over the pitch circle of the flange teeth until they contact the projections 32 and 33, after which they move outside the range of the flanges 39 and 40 towards the rear wall 35, allowing the flanges to rotate freely.

If this sequence of operations is reversed, and the slide is moved in the direction of arrow 241, the ends 37 and 38 engage the flanges and move with the flanges about the reel axes of rotation until the magnetic tape is tensioned (see the left half of FIG. 8). The right half of FIG. 8 shows the position in which the brake spring is clear of the flange 39. The advantage of this reel brake is that it can be constructed using a minimum number of parts and that the winding function is combined with the braking function.

REEL HUB COUPLING

Figure 9:
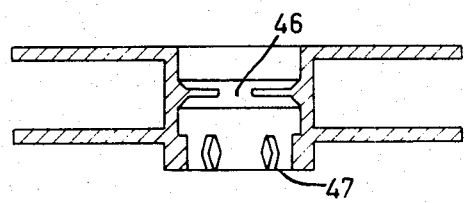
FIG. 9 is a sectional view of a part of a reel usable in a cassette embodying the invention, also showing a drive spindle of a magnetic-tape apparatus.
Figure 9:
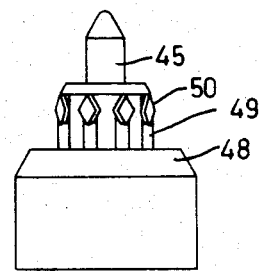
Figure 10:
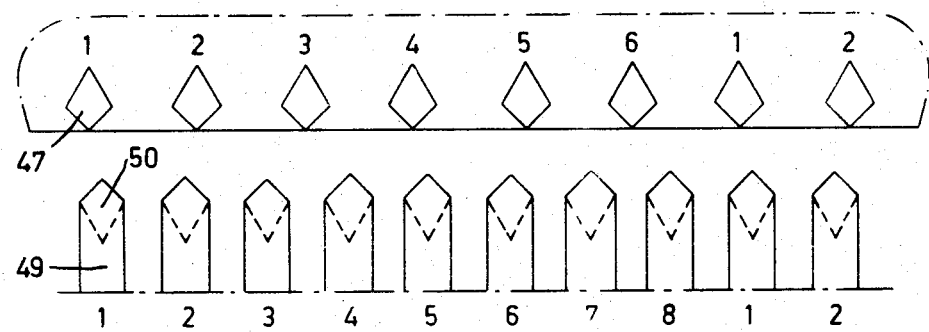
FIG. 10 schematically shows the operation of the reel drive in the embodiment shown in FIG. 9.

The embodiment shown in FIGS. 9 and 10 employs an alternative coupling for securing the reels in the cassette to their respective reel discs, while in addition the reel is centered relative to a drive spindle 45 which slides into a centering aperture 46 which is situated at approximately half the axial height in the reel when the cassette is inserted into the apparatus. Suitably, the aperture 46 is divided into three parts by slits not shown. As a result of this, the wall surrounding the aperture 46 can deflect elastically to engage with the spindle 45 without clearance. Further, on the inner side the reel comprises preferably six diamond-shaped projections 47 which are uniformly spaced along the circumference and which are situated near the lower flange. The reel disc 48 underneath the drive spindle 45 preferably carries eight tangentially resilient limbs 49 on which diamond-shaped projections 50 are arranged which resemble the projections 47. When the reel is placed on the reel disc 48 two diametrical pairs of resilient limbs 49 come into contact with two pairs of projections 47 on the inner side of the reel disc (see FIG. 10), the limbs 49 being deflected pair-wise towards each other in a tangential direction. This means that each time four limbs 49 of the reel disc 48 and two diamonds 47 of the reel do not form part of the connection. The reel can be pressed onto the reel disc 48 in any arbitrary position so that during a subsequent coupling any of the limbs 49 and diamonds 50 may assist in coupling. After the passage of the diagonal of the diamonds, that is, when the maximum deflection is reached, the resilient limbs 49 urge the reel with prestress against a stop, so that a three-point contact is obtained which is statically defined. The angles and dimensions of the diamonds 47 and 50 are accurately adapted to each other in order to minimize the coupling force, in order to obtain a maximum engagement force with the reel disc 48, and in order to transmit a sufficiently high torque. The advantage of this construction is that when the magnetic-tape cassette is inserted in a portable magnetic-tape apparatus the apparatus may be used and moved in all positions.

Figure 11:
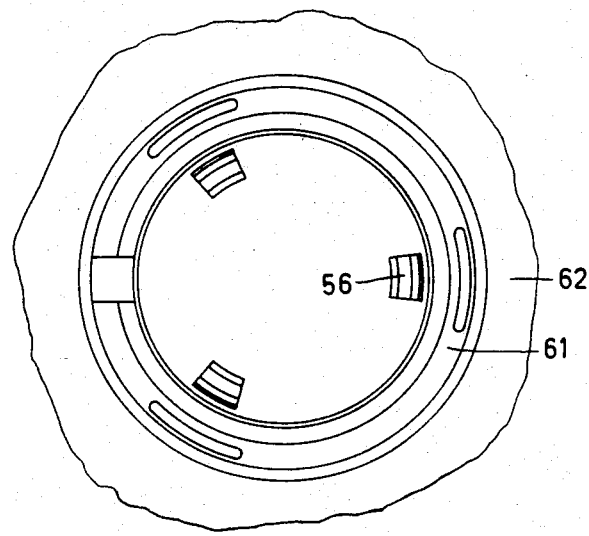
FIG. 11, on an enlarged scale, shows a part of the interior of the reel of a magnetic-tape cassette in a further embodiment.
Figure 12:
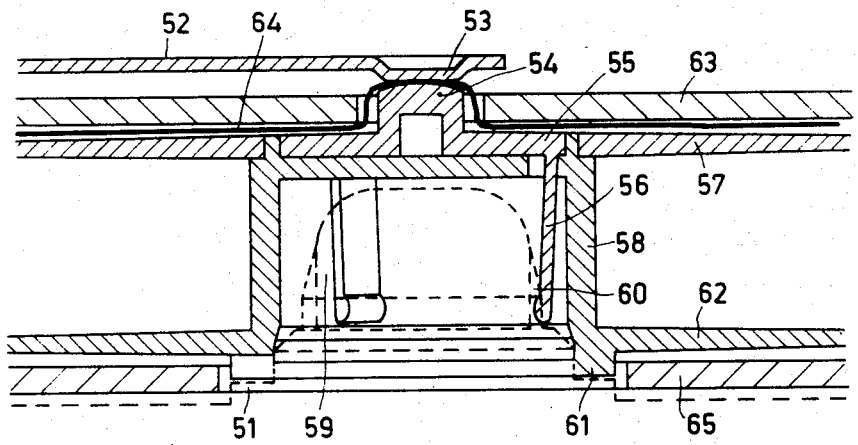
FIG. 12 is a sectional view of a part of the magnetic-tape cassette in the embodiment shown in FIG. 11.

The embodiment shown in FIGS. 11 and 12 employs another special construction of the reel in the magnetic-tape cassette in accordance with the invention. Again it is desirable that during operation the reels of a non-reversible magnetic-tape cassette are firmly pressed against reel discs 51 of a magnetic-tape apparatus in the axial direction. For this purpose the apparatus is equipped with a plate spring 52 whose free end 53 bears against a thrust portion 54 of a coupling member 55. The coupling member comprises a plurality of radially movable resilient limbs 56, three in the present embodiment. The coupling member 55 is connected to the upper flange 57 of the reel and its limbs 56 extend through apertures in a centring hub 58 of the reel. As is indicated by the broken lines a winding mandrel 59 of the magnetic-tape apparatus engage the hub 58 in the operating position, the limbs 56 engaging slots 60 in the winding mandrel 59 in a tangential direction. Via the thrust portion 54 and the coupling member 55 the spring 52 urges the reels with a projecting portion 61 of the lower flange 62 against the reel disc 51 of the apparatus. This results in a satisfactory coupling of the reel with the reel disc and a correct positioning of the reel on the reel disc. In order to seal the gap between the thrust portion 54 and the cassette major wall 69, a labyrinth seal, not shown, may be arranged around the thrust portion 54. Alternatively a foil 64 may be arranged between the flange and the major wall, which foil is suitably provided with an annular seal which fits in the gap between the thrust portion 54 and the major wall 63. Such a foil may also be used for the sealing between the lower flange 62 and the adjacent major wall 65 of the cassette.

It is to be noted that the details described for the foregoing embodiments may be combined with each other and that the magnetic-tape cassette in accordance with the invention may employ variants to these details.

What is claimed is:

1. A magnetic-tape cassette comprising a housing having a major wall and a rear wall; two adjacent reels mounting in the housing for rotation about respective axes perpendicular to said major wall, each of said reels having a flange; and brake means for tensioning a tape wound around and extending between said reels, and preventing rotation of said reels in the direction which loosens said tape when the cassette is not in use, characterized in that said brake means comprises a ridge arranged on the inner side of said major wall of the housing, and extending substantially perpendicularly to the rear wall between said reels, two projections arranged on said major wall, each projection being arranged adjacent a respective reel, one to each side of said ridge, a single brake spring having a central portion secured near an end of said ridge, respective intermediate portions arranged in a space between the rear wall and the respective projections, and braking portions near the two respective ends of the brake spring for engaging respective flanges, and a slide member slidable along said ridge, having means for engaging said brake spring at locations disposed to each side of the central portion of the spring, arranged such that movement of the slide member along said ridge in either of first and second opposite directions respectively moves said braking portions of the brake spring toward the flanges, and away from said flanges.

2. A cassette as claimed in claim 1, characterized in that said slide member includes two limbs arranged one to each side of said ridge, said limbs engaging the brake spring between the central portion and said intermediate portions of the brake springs so as to move portions of the brake springs adjacent the central portion toward the ridge when the slide member is moved in said second direction, thereby moving said braking portions of the springs away from the flanges.

3. A cassette as claimed in claim 1, characterized in that said brake spring is W-shaped, and said braking portions are moved toward each other when the slide member is moved in said second direction away from the rear wall.

4. A cassette as claimed in claim 3, characterized in that said slide member includes two limbs arranged one to each side of said ridge, said limbs engaging the brake spring between the central portion and said intermediate portions of the brake springs so as to move portions of the brake springs adjacent the central portion toward the ridge when the slide member is moved in said second direction, thereby moving said braking portions of the springs away from the flanges.

5. A cassette as claimed in claim 3, characterized in that said central portion is secured to said ridge near said rear wall.

6. A cassette as claimed in claim 5, characterized in that said slide member includes two limbs arranged one to each side of said ridge, said limbs engaging the brake spring between the central portion and said intermediate portions of the brake springs so as to move portions of the brake springs adjacent the central portion toward the ridge when the slide member is moved in said second direction, thereby moving said braking portions of the springs away from the flanges.

* * * * *